(12) United States Patent
Masten et al.

(10) Patent No.: US 9,360,852 B2
(45) Date of Patent: Jun. 7, 2016

(54) WIRELESS NETWORK MACHINE CONTROL OR A HYDRAULIC SYSTEM

(71) Applicants: Billy R. Masten, Shallowater, TX (US); Leland P. Stukey, Plainview, TX (US); Gaylen R. Stukey, Plainview, TX (US)

(72) Inventors: Billy R. Masten, Shallowater, TX (US); Leland P. Stukey, Plainview, TX (US); Gaylen R. Stukey, Plainview, TX (US)

( * ) Notice: Subject to any disclaimer, the term of this patent is extended or adjusted under 35 U.S.C. 154(b) by 393 days.

(21) Appl. No.: 13/921,769

(22) Filed: Jun. 19, 2013

(65) Prior Publication Data

US 2014/0379098 A1 Dec. 25, 2014

(51) Int. Cl.
G05B 19/042 (2006.01)

(52) U.S. Cl.
CPC .. *G05B 19/0421* (2013.01); *G05B 2219/25187* (2013.01); *G05B 2219/35444* (2013.01)

(58) Field of Classification Search
None
See application file for complete search history.

(56) References Cited

U.S. PATENT DOCUMENTS

| | | | |
|---|---|---|---|
| 5,128,671 A | | 7/1992 | Thomas, Jr. |
| 5,432,709 A | * | 7/1995 | Vollweiler ............ B65H 75/38 702/32 |
| 6,419,424 B1 | * | 7/2002 | Null ..................... B65H 49/24 242/557 |
| 6,985,750 B1 | * | 1/2006 | Vicknair ................ H04W 8/20 370/310 |
| 7,526,362 B2 | | 4/2009 | Kim et al. |
| 7,810,574 B2 | | 10/2010 | Stukey et al. |
| 8,019,867 B1 | | 9/2011 | Allen et al. |
| 8,089,225 B2 | | 1/2012 | Goossen |
| 8,106,748 B2 | | 1/2012 | Lee |
| 8,150,384 B2 | | 4/2012 | Abifaker et al. |
| 8,199,109 B2 | | 6/2012 | Robbins et al. |
| 8,216,036 B2 | | 7/2012 | Eyzaguirre et al. |
| 8,240,599 B2 | | 8/2012 | Edelson et al. |
| 8,258,917 B2 | * | 9/2012 | Cai ...................... G06F 3/0346 180/167 |
| 2004/0069497 A1 | * | 4/2004 | Jones .................... E21B 43/00 166/379 |

FOREIGN PATENT DOCUMENTS

EP 1721240 B1 8/2011

* cited by examiner

*Primary Examiner* — Sean Shechtman
*Assistant Examiner* — Steven Garland
(74) *Attorney, Agent, or Firm* — Whitaker Chalk Swindle & Schwartz PLLC; Stephen S. Mosher

(57) ABSTRACT

A machine control system, comprises at least first and second nodes of a wireless network in communication with each other, each node including a three axis accelerometer having a data output coupled to a respective sensor input of the node; and a hydraulic machine having a manifold and a plurality of hydraulic mechanisms coupled to respective outputs of the manifold, the manifold being responsive to electrical actuating signals provided from respective electrical outputs of the first node.

24 Claims, 8 Drawing Sheets

WIRELESS NETWORK MACHINE CONTROL OR A HYDRAULIC SYSTEM

BACKGROUND OF THE INVENTION

1. Field of the Invention

The present invention generally relates to machine control systems, and more particularly to a machine system controlled by a wireless electronic network.

2. Background of the Invention and Description of the Prior Art

Hydraulic machine systems are widely used in mobile equipment used in such outdoor activities as agriculture, well drilling and servicing, building and road construction and maintenance, mining of minerals and fossil fuels, and the like. Hydraulic machines are especially adapted to lifting and moving heavy and unwieldy materials. Such mobile hydraulic apparatus is conventionally operated by sets of hand-operated levers or knobs, etc., and whose operating positions are translated into control actions on various machine elements by controlling the flow of hydraulic fluid in manifolds and plumbing networks equipped with various kinds of valves, actuators, filters, pumps, motors, etc. These types of control elements require the operator to be positioned on or next to the machine to operate the controls. Often the operating conditions are difficult, inconvenient, or even hazardous due to the location of the particular control. Some machines require more than one operator to provide full control of the machine. Complex machines having many operations that must be controlled may require more than one operator, often complicating the control operations, reducing efficiency and accuracy in executing them. An example of such a machine is described in U.S. Pat. No. 7,810,574 issued to Stukey, et al. (who are included among the inventors of the present application) for a "Submersible Pump Puller and method of Use," incorporated in its entirety herein.

Computer control of machine elements is well known in the art. Conceptually, the control of a machine by a programmed computing device is routinely utilized in many industries. Typically a programmable computer is connected to a machine to be controlled. However, there are instances where the complexity of control increases to accommodate more complex machines having multiple functions, such as by the need to operate them by remote control, by the need to enable multiple control programs within a system of machines, or by the need to accommodate optional modes of operation, custom-designed machines for dedicated uses, etc. The traditional Master & Slave concept may no longer be adequate to apply to complex machinery or an entire system but only to a portion of it. Further, a machine system may have component entities that are intermediate to components associated with a master unit and one or more slave units.

Remote control of vehicles, appliances, robots, etc. is commonplace. For example, U.S. Pat. No. 8,089,225 Goossen, U.S. Pat. No. 8,199,109 Robbins et al., and U.S. Pat. No. 8,240,599 Edelson et al. describe systems, methods or apparatus for remotely controlling a vehicle. U.S. Pat. No. 7,526,362 Kim et al. U.S. Pat. No. 8,106,748 Lee, U.S. Pat. No. 8,150,384 Abifaker et al., and U.S. Pat. No. 8,258,917 Cai et al. describe remote control devices that base remote control signals on three-axis sensors such as accelerometers or gyroscopes to communicate motion and position information to a remotely controlled device. U.S. Pat. No. 8,019,867 Allen et al. and U.S. Pat. No. 8,216,036 Eyzaguirre et al. disclose wireless remote control of toys and other apparatus. However, the wireless, multi-axis remote control of complex hydraulic machine systems having a plurality of functions is a combination unknown in the prior art. Such systems frequently must rely on data from multiple sensing elements, increasing the burden of control.

What is need to overcome the disadvantages of hydraulic control systems implemented by traditional apparatus and methods is a remote control system that is convenient for a single person to operate hydraulic machinery through complex sequences of operation yet provide simplicity of operation, efficiency of control, and maximum flexibility to adjust the actions of the machine system to particular conditions that arise during its operation.

SUMMARY OF THE INVENTION

Accordingly there is provided a machine control system, comprising at least first and second nodes of a wireless network in communication with each other, each node including a three axis accelerometer having a data output coupled to a respective sensor input of the node; and a hydraulic machine having a manifold and a plurality of hydraulic mechanisms coupled to respective outputs of the manifold, the manifold being responsive to electrical actuating signals provided from respective electrical outputs of the first node.

In another aspect of the invention, each first and second nodes comprises a processor including a CPU and a program for operating the processor embedded in the CPU; a wireless transceiver coupled to the processor through a communications interface; and a plurality of inputs coupled to user-operable controls for initiating respective control functions.

In another aspect of the invention, the plurality of hydraulic mechanisms may include a hydraulic jack, a single acting hydraulic cylinder, a double acting hydraulic cylinder, a hydraulic motor, a reversible hydraulic motor, a fixed displacement hydraulic pump, a variable displacement hydraulic pump, and/or a bidirectional hydraulic pump.

In yet another aspect of the invention, each of the first and second nodes may include at least one input coupled from a sensor selected from the group consisting of an accelerometer, a tachometer, a GPS receiver, a compass, a thermometer, a spectrometer, a camera or image sensor, and/or a gyroscope.

In another aspect of the invention, the hydraulic machine comprises a mobile hydraulic machine for transporting and dispensing polyethylene pipe during water and gas well servicing operations.

In an alternate embodiment of the present invention, there is provided hydraulic machine control system, comprising a hydraulic machine having a plurality of actuating devices coupled to a manifold for controlling a plurality of hydraulic mechanisms coupled to the manifold; an electronic network of at least first, second, and third nodes, each node occupied by a processor circuit board in wireless communication with each other occupied node; wherein each processor circuit board comprises at least a CPU having a plurality of individually addressable serial I/O ports, and a communications transceiver; wherein the serial I/O ports include a plurality of electrical outputs, each connected to a corresponding actuating device for a hydraulic mechanism in the hydraulic machine control system, and wherein at least one input port is connected to a sensor device on the processor circuit board; and each said processor circuit board includes at least one user-operable switch device coupled to the CPU for initiating execution of at least one operation of machine control in the system.

In other aspects of the alternate embodiment, the sensor device is a three-axis accelerometer, the network is configured as a mesh network, and the electrical outputs include pulse-width-modulated (PWM) and ON/OFF control signals for operating hydraulic mechanisms selected from the group consisting of hydraulic cylinders, hydraulic motors, and hydraulic jacks.

In other aspects of the alternate embodiment, each processor circuit board is housed in an enclosure such that at least one user-operable switch is accessible to a user for entering an operation of machine control. Further, at least one input on the processor circuit board includes a plurality of user-operable switches for initiating operations of machine control of the hydraulic mechanism.

In yet another aspect of the alternate embodiment, the first node is configured as a master unit, the second node is configured as a handheld remote unit, the third node is configured as a console remote unit, and each of the first, second, and third units includes a plurality of user-operable switches for initiating commands. A fourth node configured as a second master unit occupied by a processor circuit board in wireless communication with each other occupied node may be included in the alternate embodiment.

In another aspect of the alternate embodiment, a fourth node configured as a second master unit occupied by a processor circuit board in wireless communication with each other occupied node may be included in the machine control network.

In other aspects of the alternate embodiment, the hydraulic machine control system is adapted to the control of apparatus such as a flexible conduit dispensing device for water or gas well installations, a bulk communications cable dispensing device, a skid-steer loader, a backhoe machine, and/or a crane.

DETAILED DESCRIPTION OF THE INVENTION

Figure 1:
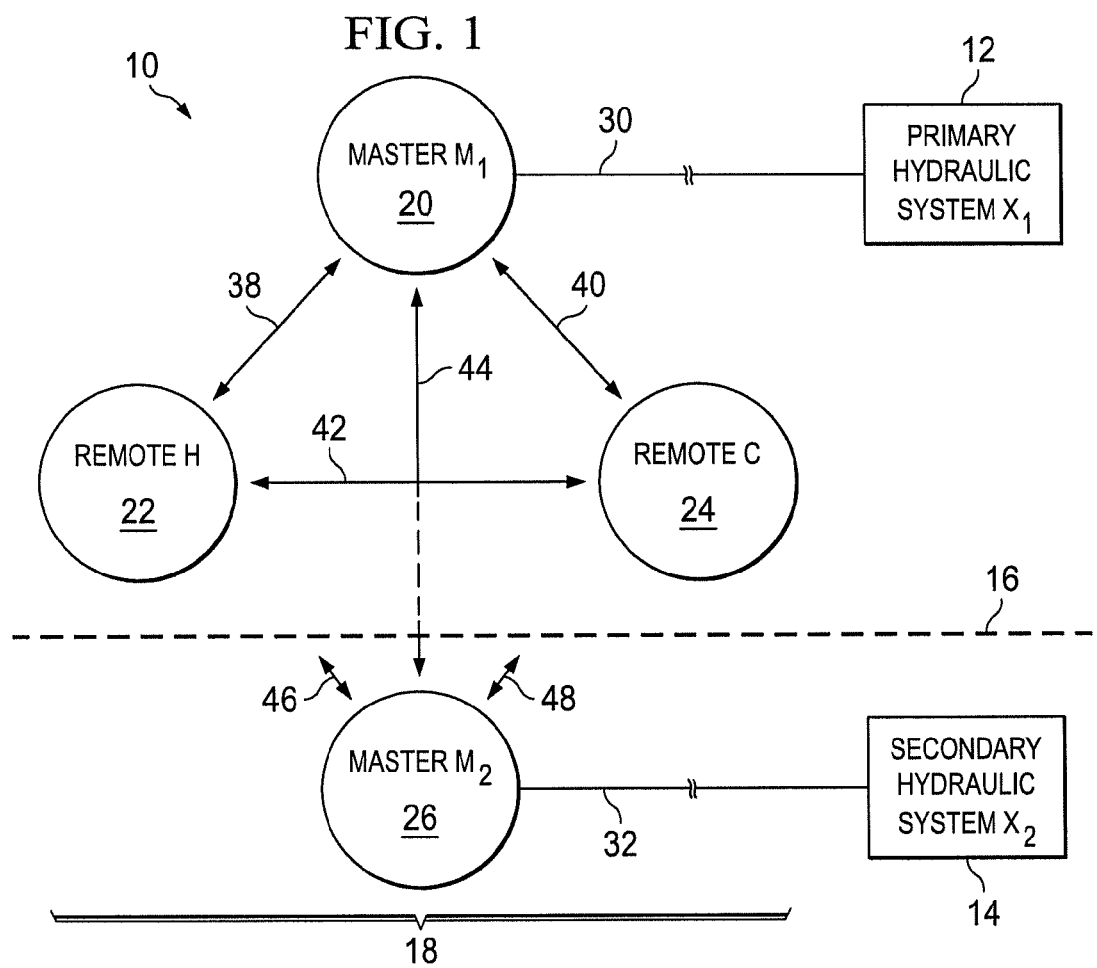
FIG. 1 illustrates a diagram of the architecture of one embodiment of a wireless machine control system according to the present invention.

Remote control of machine elements is well known in the art. Conceptually, the control of a machine by a programmed computing device is routinely utilized in many industries. However, there are many instances where the complexity of control increases to accommodate systems of several machines having multiple functions, by the need to operate them by remote control, by the need to enable multiple control programs within the same system of machines, accommodate optional modes of operation, provide for proportional control, and the need to adjust to specific arising conditions, etc. The traditional Master & Slave concept is no longer adequate to apply to an entire system but only to a portion of it. A system may have or require entities or components that are intermediate to entities associated with a master unit and one or more slave units. Further, complex systems, especially in the communications fields, are often amenable to control through a network of entities connected together via wired or wireless links.

Accordingly, these two concepts, programmed electronic control and an interconnecting network of entities, suggest a possible architecture to provide remote control of a system of hydraulic machine elements on an industrial machine apparatus by a single operator, for example, in the Wireless Network Machine Control for a Hydraulic System to be described herein. For purposes of the following description the term hydraulic machine may be broadly interpreted as a machine wherein the operating force is a fluid substance conducted through circuits and circuit components that perform their function according to the passage of fluid under pressure through them or upon them. The fluid substance may be a liquid or a gas. Thus a pneumatic device is understood to be the functional equivalent of a hydraulic device.

The machine control system described herein may be effectively used to control hydraulic apparatus such as but not limited to a flexible conduit dispensing device for water or gas well installations, a bulk communications cable dispensing device, a skid-steer loader, a backhoe machine, and a crane. Other apparatus may include an aggregate dispenser, and machines adapted to lifting, pressing, bending, conveying, cutting, stamping, molding, and combinations thereof.

The exemplary system includes two principal sections: a multi-axis electrical control system and a multi-function hydraulic machine system. The exemplary hydraulic machine to be described is a system for transporting and dispensing or retrieving extended lengths of flexible polyethylene pipe or tubing ("poly pipe") used in water or gas well servicing applications. The poly pipe is stored on a large spool that must be precisely controlled to dispense the pipe into a well or retrieve the pipe from a well. In a typical operation, the poly pipe is connected to a submersible pump assembly and installed in the well bore. The electrical control system is built around three types of units: master, console, and hand-held. Each may have the same microprocessor or digital processor circuit in combination with a wireless transceiver, operating under program control embedded in the processor memory. The circuit included in each unit may include several communications I/O ports, a plurality of input ports for sensors, switches, etc. and several output ports for operating actuators with pulse width modulated output signals, to control the various hydraulic machine components in the system.

The wireless transceiver (which may employ an RF, optical, magnetic, or electrostatic technology) enables each of the three types of units to communicate in a wireless network with each other, including acting as master (which may generate control signals and execute a control action), console, or remote, depending on how it is addressed. The master sends a query for a desired action or for sensor data from another unit in the network to be controlled, either one that is attached to a machine (e.g., a console unit) or held in one's hand (e.g., a smaller scale or portable remote unit, which may be functionally similar to a console unit except it may have fewer switches for operating it). Any unit in the network may act as a master by initiating a query (for data, status of a sensor, etc.) or instruction.

Each unit preferably includes a three axis accelerometer that senses changes in position along x, y, and z axes—that is, six directions—of the unit containing the accelerometer. Each unit may also have a tachometer, GPS receiver, magnetic sensors such as a compass, environmental sensors, camera, spectrometer, gyroscope, etc. Thus, motion of one unit in communication with another unit in the network can be used to instruct the other unit or elements of the hydraulic machine in the system what direction, or how high or low, or how fast or slow to move as part of a control signal.

In one example, the vertical or horizontal orientations (i.e., its angle) of a boom on the apparatus can be remotely controlled by pressing a function button and tilting or rotating a hand held unit—the motion of the boom responds by mimicking the motion of the hand held unit. In another example the path and speed of a mobile, motorized object or lifting device can be controlled by changing the orientation of a hand-held unit, with the speed or force exerted may be proportional to the angle of inclination of the hand-held unit. Smooth, continuous motion is readily controllable by the hand-held unit.

A variety of machines and vehicles may be efficiently operated and controlled using this wireless machine control network. A particular advantage is that only one hand is required to completely specify the control action required simply by changing the orientation of the unit being held, as the on-board accelerometer senses the change and converts it to a signal that is processed and transmitted via the wireless network to the unit that effects the change in orientation of the controlled unit. However, although the present invention is designed to enable one person to control a complex machine system, this does not mean it is limited to operation by a single person. Certainly several persons, each having access to one of the nodes in the network may operate the system in concert, coordinating their actions with one another.

Some examples of equipment that may be remotely controlled include farm implements, materials-handling vehicles and machines, construction machines and vehicles, and the like. In general any machine or motorized device, including hydraulic apparatus as in the present illustrative apparatus, that carries, moves, or handles material of any kind, works the soil, or performs work that a mobile robot could perform is susceptible to operation and control using this invention. Machinery used in agriculture, mining, construction, and inventory handling of all kinds, even military applications requiring the use of vehicles and mobile equipment are just some of the applications that are contemplated.

The principles and concepts of the invention are not limited to hand-held remote control of apparatus. The units may be attached to a helmet or other headgear to enable hands-free operation of apparatus simply by movements of the head, such as with persons who lack the use of their hands or their hands are otherwise occupied. Further, controls and sensors mounted in a first mobile device can enable operation of a second mobile device that mimics the operation of the first mobile device. The foregoing is an example of a two-node network; that is, a machine control system may employ a simple control network of two nodes consisting of a master unit and a hand-held unit, or of two units having that same capabilities such that either can interchangeably operate as a master node.

In the detailed description to follow, the embodiment illustrated in the accompanying drawings utilizes first and second master units, one console unit and one hand-held remote unit, which operate to control an exemplary hydraulic system. In a key aspect, each such unit of the electrical portion of the system is defined as a node in a network. Each node has a unique address. As is well known, an eight bit address word enables up to 256 node addresses. All of the units preferably contain processors having a plurality of wired or wireless serial I/O ports for inputting data from sensor units, outputting drive signals, or communicating with other units. The processors operate under program control for executing the various functions assigned to the processor. Initiation of these functions may be provided by user-operable switches or buttons accessible to the user. In many cases the input sensors are located on-board the unit that will receive and process the sensor data. Further, the output ports of a unit may preferably but without limitation supply pulse-width-modulated (PWM) signals via wired connections to operative devices in the system—solenoids or other actuators coupled to the machine element in the hydraulic system to be controlled. A machine element may be hydraulic or electrical, although in some cases pneumatic elements may be used as long as they are operable by electrical signals from the network.

Communication between the units or nodes of the control network is preferably wireless. In the illustrative embodiment described herein, a machine that utilizes a system of hydraulic components such as cylinders, motors, and jacks, the inter-unit communication is provided by an RF transceiver in each unit as one example, without limitation thereto, of a wireless system. The communication protocol is chosen so that communication is always initiated by one of the master units, to avoid ever taking actions when communication is interrupted. The master periodically requests information from the other nodes in the network; if the information is valid, the master initiates an action. If the information received is not valid, the master aborts the process, shuts everything down and restarts the sequence—address a unit, request data, verify data, initiate action, etc. Thus, the communication protocol defaults to shut down/restart in case of an error.

A generalized description of the system operation begins upon power-up with engagement of the system by a master unit and determining whether a console or remote unit has control, followed by entering a specified command (pressing a labeled button or switch) on a console or remote unit or the master unit to initiate a control operation. This action sends a wireless signal with the address of the desired function to request data regarding the operative status (i.e., the start point or current condition) of the desired function and return it to the master unit. The master unit then generates a control signal according to the returned data, the control input (entered by the switches), and the program in the processor. The control signal may be transmitted as a PWM drive or proportional signal or an On/Off signal as a command to the respective actuator, solenoid, or relay to operate the desired function, in both direction and duration, until the needed endpoint (i.e., stop the function) is reached. The drive signals may be transmitted as PWM signals for the variable functions or as binary (On/Off) signals via wired or wireless links from a node to an actuating device. The operative functions may be hydraulic cylinders, motors, pumps, valves or electric motors or winches, etc. The operative functions may also be pneumatic cylinders, motors, jacks, or tools. Persons skilled in the art recognize that both hydraulic and pneumatic actuators and devices operate on the flow of fluid substance under pressure. Thus the symbols in a drawing of a hydraulic system may, in some cases represent the functional equivalent of pneumatic devices. The drive signals for either type of actuating devices may typically be derived from proportional settings of potentiometers, etc. In some cases, where the destination actuator requires a higher drive current than is available from a master unit, an outboard PWM driver circuit may be used. The physical network topology in this exemplary embodiment resembles a mesh structure, as depicted in the example depicted in FIG. 1. This is because each node in the network may communicate with any other node on the network. In FIG. 1, four units or nodes are linked by six RF communication paths, one path connecting each pair of nodes. The four nodes are Master 1 (M1), Master 2 (M2), Console Remote (Remote C), and Hand-Held Remote (Remote H). Master M1 may be coupled to a primary hydraulic system 12 and, in the illustrated embodiment, a second master unit, M2 may be coupled to a secondary hydraulic system 14. The system of FIG. 1 is but one of a number of possible arrangements of a network topology, provided herein to demonstrate the operation of the present invention. In an alternate form of the illustrated embodiment the second master M2 may not be used, leaving a simpler mesh network having three RF communication paths linking three nodes, master M1, Remote C, and Remote H as shown above the broken line 16. Each node (See FIG. 2) typically but without limitation typically includes (a) a plurality of switches for operator use (some more than others, as will be described); (b) a plurality of inputs from on-board sensors (as will be described); and (c) a plurality of outputs for operating relays (solid state or electromechanical), solenoids, etc. to implement a control action. In some alternate embodiments, inputs from outboard sensors may also be utilized. The topology of the network may, of course become more extensive, or more complex, as the number of nodes in the network is increased.

Each node or unit—master, console, or hand-held, communicates with any of the other units by the wireless link between them. In the illustrated example the communication is provided by an RF transceiver in each unit. While each unit may have the same processor, RF transceiver, and antenna combination, it may differ in the provision of accessible inputs, outputs, and switches installed on the unit's housings to enable selection of functions and entry of commands to be sent to one of the other units. Inputs may primarily be provided for connections to on-board sensors to be described. other inputs may be available for outboard or external sensors. Outputs are primarily provided for pulse width modulated (PWM) signals through wired connections to relays, solenoids, or other operable devices on the machine to be controlled. Output signals may be coupled by wireless links as appropriate, for remote control of certain functions, for example. Switches are generally mounted on the unit's housing to enable the operator to operate the network control system described herein.

In use, a master unit is generally attached to the machine system to be controlled so that its wired PWM output signals may be connected to the appropriate control elements incorporated into the machine. Thus, in the present example of FIGS. 1, 2, and 3, master M1 may be mounted on the primary hydraulic system and connected to its actuators, sensors, etc. via wired connections (perhaps conveying PWM control signals or remote sensor signals) that may be bundled together in a cable or wiring harness 30. Similarly, the master M2 may be mounted on the secondary hydraulic system 14 and connected to its actuators, sensors, etc. via wired connections (for, e.g., PWM control or remote sensor signals) that may be bundled together in a wiring harness 32. The hand-held remote H may be typically carried by the operator to initiate control actions. Further, the hand-held remote may be powered by a power source such as a battery or solar generator, or, in some cases by wired electricity if the hand-held remote is connected by a tether to a hydraulic system operated by the control network. The console remote C may be (a) attached to the machine to be controlled to function as an auxiliary master unit, with PWM outputs to destination control points, or may be (b) utilized as a remote unit (attached to the machine or not). The hand-held remote H typically may have only a limited number of switches for selecting functions or entering commands. The console remote C may have a full complement of switches to enable the selecting and entering operations. In some systems, a second master M2 may be included (a) when a secondary machine or system must be operated in coordination with a primary machine or system; or (b) when a second, related machine is located some distance away from the first machine but the two must be controlled as a single system.

Referring now to the drawings, FIG. 1 illustrates a diagram of the architecture of one embodiment of a wireless machine control system 10 according to the present invention, including an arrangement of wired and wireless links used in the network 18 and one example of a hydraulic machine system controlled by the control system 10. The hydraulic machine system includes a primary hydraulic system 12 and a secondary hydraulic system 14 coupled to a wireless network 18 of four nodes including a master M1 (20), a remote H (22), a remote C (24) and a master M2 (26). The four nodes 22-26 are wirelessly linked together by the wireless links 38, 40, 42, 44, 46, and 48 as shown by the arrows in the figure. The master M1 (20) may be coupled to the primary hydraulic system 12 via the wired primary connection, wiring harness 30 shown and the master M2 (26) may be coupled to the secondary hydraulic system 14 via a wired secondary connection, wiring harness 32. In other embodiments, the primary 30 and secondary 32 connections may be provided by wireless connections. The figure includes first A and second B embodiments. The first embodiment A includes the structures above the broken line 16 in the figure, which is characterized by a single master M1 (20) and a single hydraulic system, the primary hydraulic system 12. The second embodiment B includes the combination of the first embodiment plus an additional master M2 (26) and an additional hydraulic system, the secondary hydraulic system 14.

It will be noted that the wireless network 18 of the four nodes (or three nodes in the first embodiment A) shown in FIG. 1 resembles a mesh-type network in that each node may be directly coupled to each other node in the network. Hereinafter, master M1 (20) will be designated master M1 and master M2 (26) will be designated master M2. The remotes H (22) and C (24) will be designated remote H and remote C respectively. These designations convey the identity and function of each of these nodes more clearly than the usual reference numbers. Remote H may be a "hand-held" remote unit; remote C may be a "console" remote unit to distinguish it from the hand-held remote unit. The console 24 is so-named in this description because it may be larger than the hand-held unit H 22, and mounted on the primary hydraulic system 12. These differences will become clear in the description that follows.

The primary hydraulic system 12 in the illustrated embodiment to be described herein is a mobile chassis (see FIGS. 7 and 8) that includes a hydraulic system for dispensing polyethylene pipe from a large storage spool mounted on the chassis. The polyethylene pipe (or "poly pipe") is typically used as the pipe in a water well, although other uses in wells and other down-hole operations may be provided by the apparatus described herein. The hydraulic system 12 includes a manifold and conduit circuits coupled to various hydraulic cylinders, motors, pumps, filters, etc. (collectively, hydraulic components), generally controlled by electrical signals from the network 18 that are directed to actuators, solenoids, and relays for operating the hydraulic components. The actuating devices listed in the foregoing sentence may include, in some applications, pneumatic actuators for operating certain functions. The system 12 may include one or more accessory devices, including some to be described herein and which may be controlled by hydraulic or electrical mechanisms. The secondary hydraulic system 14 may include an auxiliary apparatus or mechanism for use in conjunction with the system 12. In the present description the system 14, described as one example, the auxiliary mechanism is a crane device that may be used and controlled with the wireless machine control network of the present invention. The system 14 in general may also include a manifold and hydraulic conduit circuits and components similar to system 12.

Figure 2:
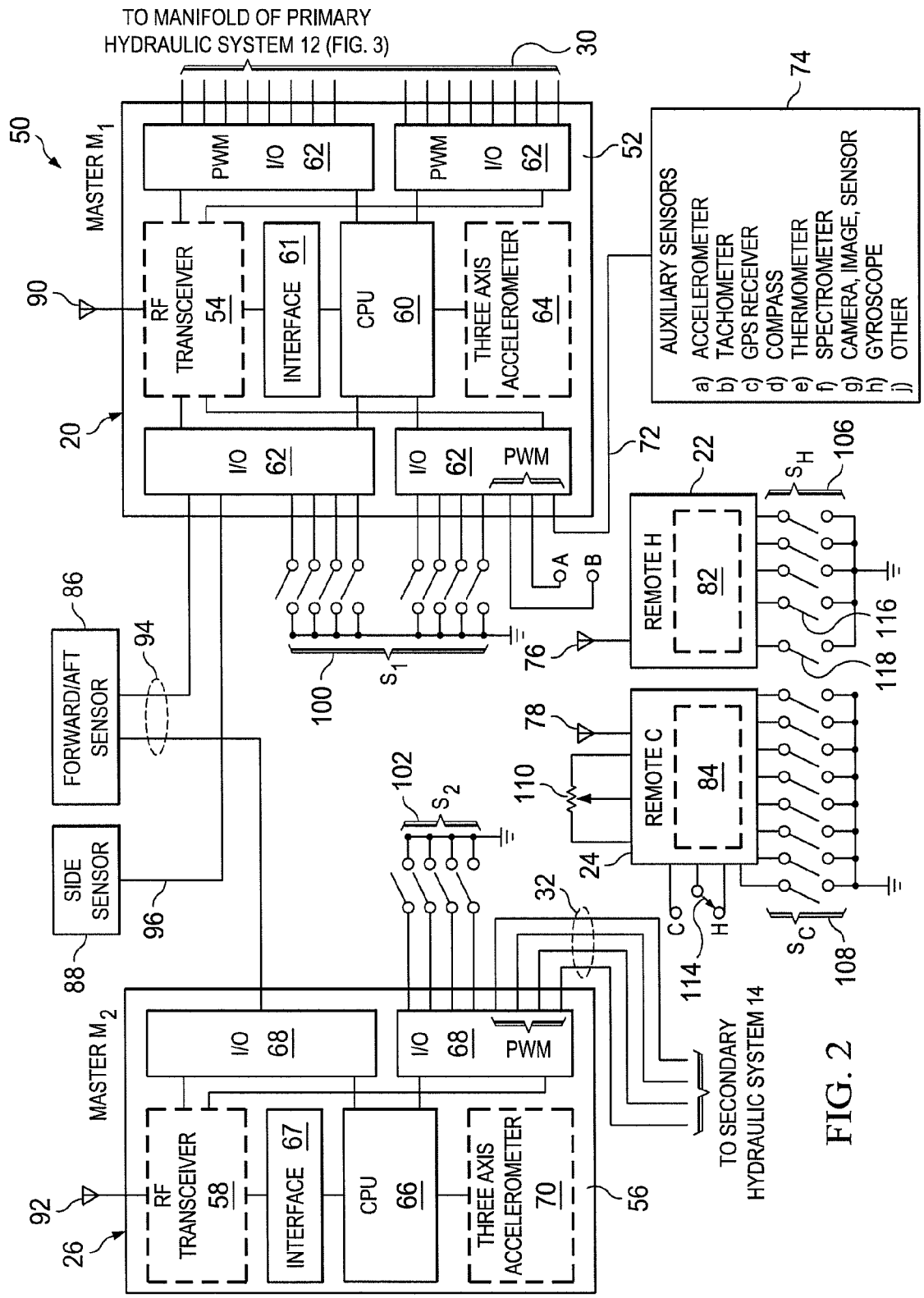
FIG. 2 illustrates a block diagram of the electrical portion of one embodiment of the invention of FIG. 1, including an arrangement of wired and wireless links used in a control network.

FIG. 2 illustrates a block diagram of the electrical portion 50 of one embodiment of the machine control system 10 of FIG. 1, including an arrangement of wired and wireless links used in the wireless network 18 of the control system 10. Structures shown in FIG. 2 having the same reference numbers as in FIG. 1 or in other figures herein are the same structures. In this example, the master M1 includes a micro controller 52 and an RF transceiver 54, which is coupled to an antenna 90. The micro controller 52 includes a CPU 60 and at least four sets of eight I/O pins 62. The master M2 includes a micro controller 56 and an RF transceiver 58, which is coupled to an antenna 92. The micro controller 56 may include a CPU 66, a digital-to-analog converter, and at least two sets of eight I/O pins 68. The CPU in each micro controller preferably includes RAM and ROM for storing data and operating programs for executing the functions provided by the master units. Each master M1, M2 preferably includes an on-board three-axis accelerometer, Ref. 64 in M1 and Ref. 70 in M2. Several banks of I/O pins in the masters M1 and M2 include pulse-width-modulated (PWM) outputs for driving loads such as actuators, solenoids, or relays that require substantial current to operate them. Micro controllers 52, 56 may be a type MSP430f149 available from Texas Instruments, Dallas, Tex. 75265. The RF transceivers 54, 58 may be a type TRM-433-LT available from Linx Technologies, Inc., Merlin, Oreg. 97532. The RF transceivers 54, 58 may be each coupled to the CPU 60, 66 via a respective communication interface 61, 67.

Also shown in FIG. 2 are remote H (hand-held 22) and remote C (console 24), which may each preferably contain the same micro controller and RF transceiver components as used in masters M1 and M2. Elsewhere in this description the remote H and remote C may also be called the remote unit H (22) or the console unit C (24) respectively. This is because each node employs the same basic control circuitry and is in wireless communication with each other node when the system is operating. The remotes H and C are shown in smaller form in the drawing, without their internal components, to improve the clarity of the drawing. While it is understood that all of the node units, 20, 22, 24, and 26 in this example contain the same basic circuitry, they may differ primarily in the utilization of their I/O capacity. The CPU in each micro controller of the remote H and console C units preferably includes RAM and ROM for storing data and operating programs for executing the functions provided by the remote H and units. The remotes H, C thus both include an antenna, respectively antenna 76 and antenna 78, and also may preferably and respectively include on-board three-axis accelerometers 82, 84. In general, the remotes H, C may require or utilize fewer I/O pins as will become apparent in the description herein.

Regarding the I/O pins in the drawing, the lines connecting them are understood to be wired connections unless otherwise noted. The remote C (24) includes two features for setting control functions, a potentiometer 110 and a two-pole switch 114 having a first position H and a second position C as shown. The potentiometer provides a reference for adjusting the tension exerted on a wire cable to be described in FIG. 7. The two-pole switch 114 provides for locating system control in the hand-held remote H or the console remote C (See FIGS. 4 and 5). The remote H (22) may include separate buttons (switches) for, as examples, initiating a control action to raise/lower (116) the tower 416 of the hydraulic system shown in FIG. 8, or to dispense/retrieve (118) the poly pipe 410 from the spool 408 on the poly rig 400. These buttons (switches) may signal actions that are responsive to the data from an optional outboard three axis accelerometer 74a that may be contained in the remote unit H (22) or the console unit C (24) as described in FIG. 6.

Continuing with FIG. 2, a plurality of wired outputs 30 from the I/O pins 62 that provide PWM signals, of master M1 are shown. The wired outputs 30 provide connections and drive signals from the master M1 to the hydraulic manifold 122 of the hydraulic system 120 shown in FIG. 3, which is the primary hydraulic system 12 that appears in FIG. 1. The remaining I/O pins 62 in the master M1 primarily include wired connections 94 and 96 respectively to an external fore-aft sensor 86 and an external side-to-side sensor 88, a bank 100 of user-operable switches S1, and a wired connection 72 to an auxiliary sensor 74. In some alternate embodiments, Master M1 may transmit control signals via wireless or wired connections to external PWM drive circuits to control individual solenoids, relays, actuators, etc. for specific hydraulic functions. For example, the PWM output signals at terminals A, B of the master M1 (20) may be wired to corresponding terminals A, B of the primary hydraulic system 12 (See FIG. 3) for operating the spool wheel motors 142, 144. Alternatively, the PWM output signals at A, B may be routed within the master M1 (20) for wireless transmission from the RF transceiver 54. If a second master M2 is used, a wired connection 94 between them may be employed if the secondary hydraulic system 14 is mounted on the chassis of the primary hydraulic system 12.

Continuing further with FIG. 2, the bank or array of switches $S_1$ (100) may be provided as user-operable controls on the housing of the master M1 (20), each control dedicated to initiate a particular function. The controls, though shown as switches, may be any of the following components selected from the group consisting of switches, rotary controls, linear controls, joysticks, and keypads. Although only eight such switches are shown in the drawing to save space and improve clarity, more can be used, depending on the capacity of the I/O pin sections 62 in the micro controller 52. Similarly, the master M2 includes a bank of switches $S_2$ (102). Other banks of such switches are shown on the Remote H (22) as $S_H$ (106) and $S_C$ (108). Examples of the uses of these switches on the nodes 20, 22, 24, and 26 of the wireless network 18 are listed in the TABLE 1 below, which lists the functions provided by the wireless network 18 to control the exemplary hydraulic system formed by the combination of the primary 12 and secondary 14 hydraulic systems shown in FIGS. 1, 2, and 3. Each function in Table 1 is also identified in FIG. 3. The auxiliary sensor 74, shown connected to the master M1 in FIG. 2, may in some applications include a plurality of external sensors selected from a group including accelerometer 74a, tachometer 74b, a GPS receiver 74c, compass 74d, thermometer 74e, spectrometer 74f, camera or image sensor 74g, gyroscope 74h, and other 74j, each of which may be connected to an available I/O pin 62 in the master M1.

As examples, an accelerometer or gyroscope used as a sensor may be used to provide control of a machine element by relating an intended action to a gesture by the user of a hand-held remote unit such that the controlled component replicates in a scaled motion the gesture of the user. A tachometer provides information about the rotational speed of a component, which can be translated into a control signal to vary the rotational speed of the component. A GPS receiver and/or a compass or magnetometer may be used to provide position information for generating a signal change a component or apparatus to a new position. A camera or image sensor may be used to provide visual information for monitoring position or function of a controlled component. A thermometer or spectrometer are examples of instruments that can be used to provide sensed data for developing a control signal where environmental conditions or the characteristics of a substance involved in the operation of the machine under the control of the system must be monitored.

TABLE 1

Left Front Jack UP
Left Front Jack DOWN
Left Rear Jack UP
Left Rear Jack DOWN
Right Front Jack UP
Right Front Jack DOWN
Right Rear Jack UP
Right Rear Jack DOWN
Spool Tower UP (Extend tower height)
Spool Tower DOWN (Retract tower height)
Spool Tower FORWARD (Lift tower toward well)
Spool Tower AFTWARD (Lift tower away from well)
Spool Tower SIDE-TO-SIDE (RIGHT) (Pivot tower platform CW)
Spool Tower SIDE-TO-SIDE (LEFT) (Pivot tower platform CCW)
Spool IN (rewind poly pipe)
Spool OUT (dispense poly pipe)
Pump Rack UP (Lift submersible pump into position)
Pump Rack DOWN (return rack to initial position)
Wire Spool Tension (Console adjustment of tension in electrical wire to pump)
Tool UP (Raise terminator tool)
Tool DOWN (Lower terminator tool)

Additional I/O connections from the master M1 (20) include a wired connection 94 to a Fore-Aft sensor 86, a wired connection 96 to a Side-to-Side sensor 88, and wireless connections via the antenna 90 to an antenna 76 on the remote H 22 and an antenna 78 on the remote C 24.

In some embodiments of the present invention a second master M2 (26) may be used, for example to control a secondary hydraulic machine or system 14. In this example, a crane 490 (See FIG. 7) may be used for lifting a submersible pump 480 and motor 482 assembly to load it on to a pump rack 484, for example, to be described further in FIG. 7. The master M2 (26) shown in FIG. 2 depicts one such configuration. The master M2 (26) becomes an additional node in the machine control network 50 of FIG. 2, which illustrates the wireless network 18 shown in FIG. 1 in greater detail. Master M2 (26) is shown with substantially less I/O, a reflection of its secondary role in the overall operation of the system 10. As with the master M1 (20), there may be three types of I/O in use—a wireless link via the antenna 92 coupled to the RF transceiver 58 in the master M2 (26), wired connections to a bank S2 of user-operable switches 102, and a set of wired connections 32. The connections 32 may output PWM drive signals to the secondary hydraulic system 14 for proportional control of hydraulic machine components or output binary control signals for operating actuators, solenoids, or relays. The secondary hydraulic system 14 is not fully illustrated in this application because it would basically be a duplicate—both structurally and functionally—of the primary hydraulic system 12 shown in FIG. 3 except for (usually) a lesser number of components connected to a manifold. The crane 490 including a lift cable 494 and a hydraulic winch motor 170 shown in FIG. 8 may be considered as one example of a secondary hydraulic system that utilizes a separate hydraulic control system. Persons skilled in the art will readily understand the structure of a secondary hydraulic system 14 if one is intended in practicing the present invention. This is an excellent illustration of the scalability of the invention that may include many nodes in the machine control system 10 and more hydraulic machine elements than the simplified one illustrated and described herein.

Figure 3:
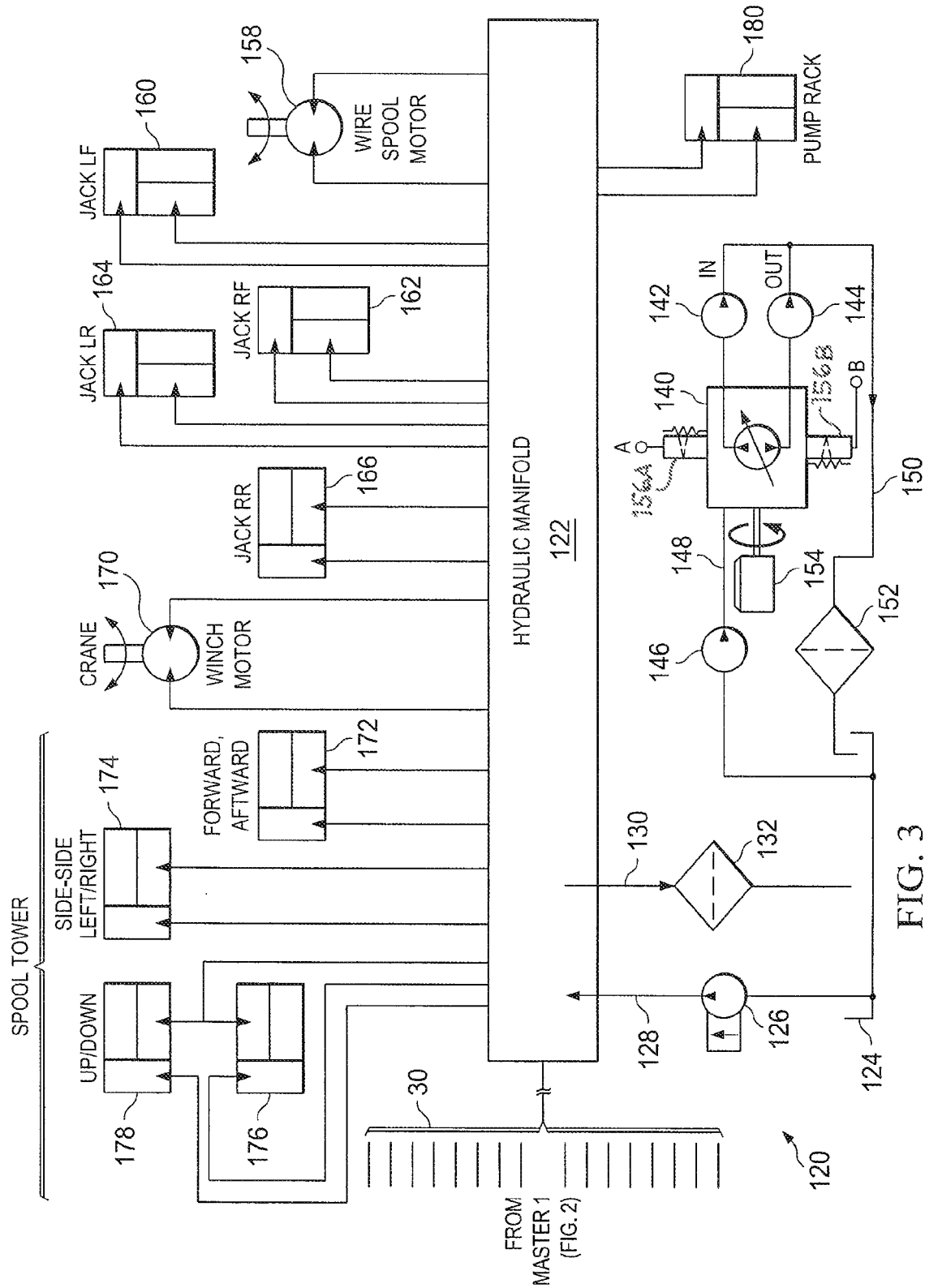
FIG. 3 illustrates a block diagram of the hydraulic portion of the embodiment of FIGS. 1 and 2.

FIG. 3 illustrates a block diagram of the hydraulic portion of the embodiment of FIG. 1, that is, the primary hydraulic system 12, also denoted system 120 herein and on FIG. 3. The system 120 includes a hydraulic manifold 122 for distributing hydraulic fluid from a reservoir 124 under pressure provided by a fixed displacement, constant pressure pump 126 through the conduit 128 into the manifold 122. The fluid is re-circulated from an outlet of the manifold 122 through conduit 130 and a filter 132 and returned to the reservoir 124. The reservoir 124 also supplies hydraulic fluid to a variable displacement, bidirectional pump 140 that may be driven by a diesel engine 154. The bidirectional pump 140 provides output to drive a Spool IN wheel motor 142 and a Spool OUT wheel motor 144. Fluid is returned to the reservoir 124 via conduit 150 and filter 152. Persons skilled in the art will recognize that the diesel engine 154 may be used to power other devices in the system. For example, compressed air provided from an air compressor may be driven by the diesel engine 154. The compressed air may be use for operating pneumatic actuators or devices for auxiliary functions in the system.

A fixed displacement charge pump 146 is included in the feed line conduit 148 to the bidirectional pump 140 to compensate for leakage that occurs in the bidirectional pump 140. The bidirectional pump 140 includes and is controlled by a Spool IN solenoid 156A and a Spool OUT solenoid 156B as shown in FIG. 3. In this embodiment, the solenoids 156A and 156B are respectively controlled by the output signals A, B sent by the master M1 (20). The manifold 122 provides a plurality of output lines to actuators, solenoids, and relays to activate the operation of hydraulic mechanisms including hydraulic cylinders, a winch, a wire spool motor, and a wire tension regulator. In other applications, a variety of valves, motors, cylinders, actuators, regulators, pumps, and the like may be operated from the hydraulic manifold. As will be readily apparent and described below, the manifold 122 may preferably include actuators, solenoids, and relays (not shown) that are operated by electrical signals supplied by the control network 18/50 via the cable connection 30 (FIGS. 1 and 2).

Figure 7:
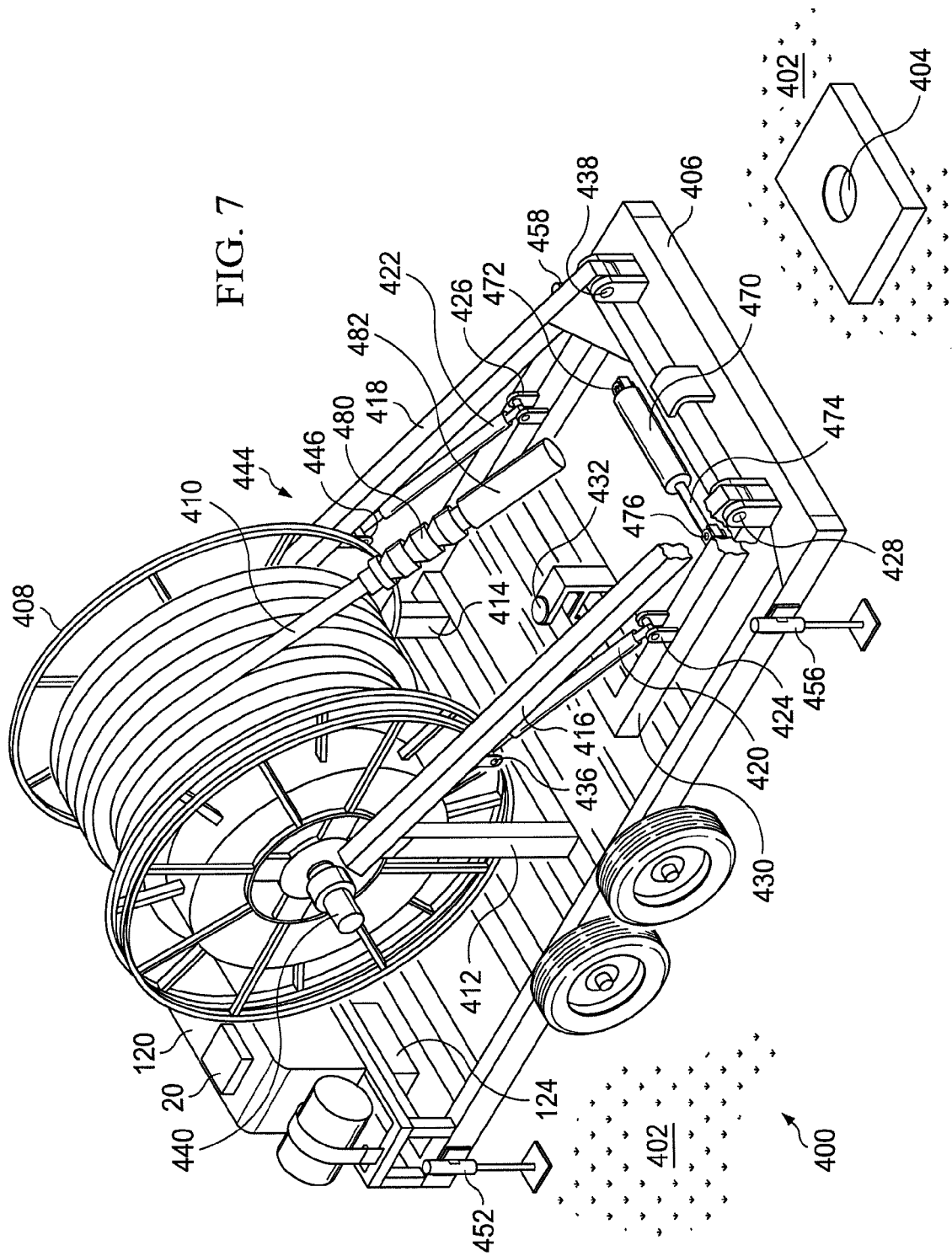
FIG. 7 illustrates a pictorial drawing of a rig for dispensing polyethylene pipe into subsurface wells under the control of the embodiment of FIGS. 1 through 6.

Continuing with FIG. 3, actuators for the hydraulic mechanisms employed in the exemplary embodiment are provided at respective outputs of the manifold 122. The wire spool motor 158 and the winch motor 170 for the crane (also called a crane winch motor 170) are both bidirectional hydraulic motors that are actuated by outputs from the manifold 122. As shown in FIG. 7, the wire spool motor 158 dispenses and rewinds as necessary an electrical cable 488 for operating a submersible pump 480 and motor 482 assembly to be described. The wire spool motor 158, which controls wire spool 478 is operated so as to maintain a prescribed tension on the cable 488 as set by a potentiometer 110 on the console C 24. The crane winch motor 170 operates a winch 492 (FIG. 8) that raises and lowers a lift cable 494 for loading the submersible pump 480 and motor 482 assembly onto a lifting rack (pump rack 484, to be described in FIG. 8) to facilitate attaching the submersible pump 480 and motor 482 assembly to the end of the poly pipe 410 prior to installing the submersible pump 480 and motor 482 assembly into the well 404 being serviced. The Spool Wheel motors 142, 144 are controlled and operated by the variable volume, bidirectional pump 140 that is driven by a diesel engine 154. The spool wheel motors 142, 144 are respectively activated and controlled by the solenoids 156A, 156B responsive to signals applied to terminals A, B by the master M1 (20).

A set of hydraulic jacks, one provided at each corner for leveling and stabilizing the chassis 406 (See FIG. 6) that carries and supports the poly pipe dispensing apparatus 400 (FIG. 6) is also driven by outputs of the manifold 122. These jacks include actuators for a left front jack 160, right front jack 162, left rear jack 164, and right rear jack 166. Other actuators are provided for manipulation of the tower that raises, lowers, positions the poly pipe spool. These include the Spool Tower controls: Forward/Aftward 172, Side-to-Side 174, Up/Down 176 and 178 (requires two hydraulic cylinders), and In/Out Spool Wheel Motors 142, 144. A Pump Rack, for raising and lowering a submersible pump and motor assembly for attachment to the end of the poly pipe prior to installing it in a well, is controlled by Pump Rack cylinder 180.

The hydraulic machine control system illustrated in the accompanying drawings is thus seen to be capable of providing operational control of a variety of functions in the machine including forward and reverse rotation of a take up spool (poly spool 408), rotation speed of the take up spool, side-to-side disposition of the take up spool, extension and retraction of a telescoping beam element (e.g., the tower 416), the angle of elevation of the tower beam, the angle of elevation of the crane 490, the angle of azimuth of the crane, the extension of the crane, and the elevation or retraction of a jack mechanism such as the jacks 452, 454, 456, 458.

Figure 4:
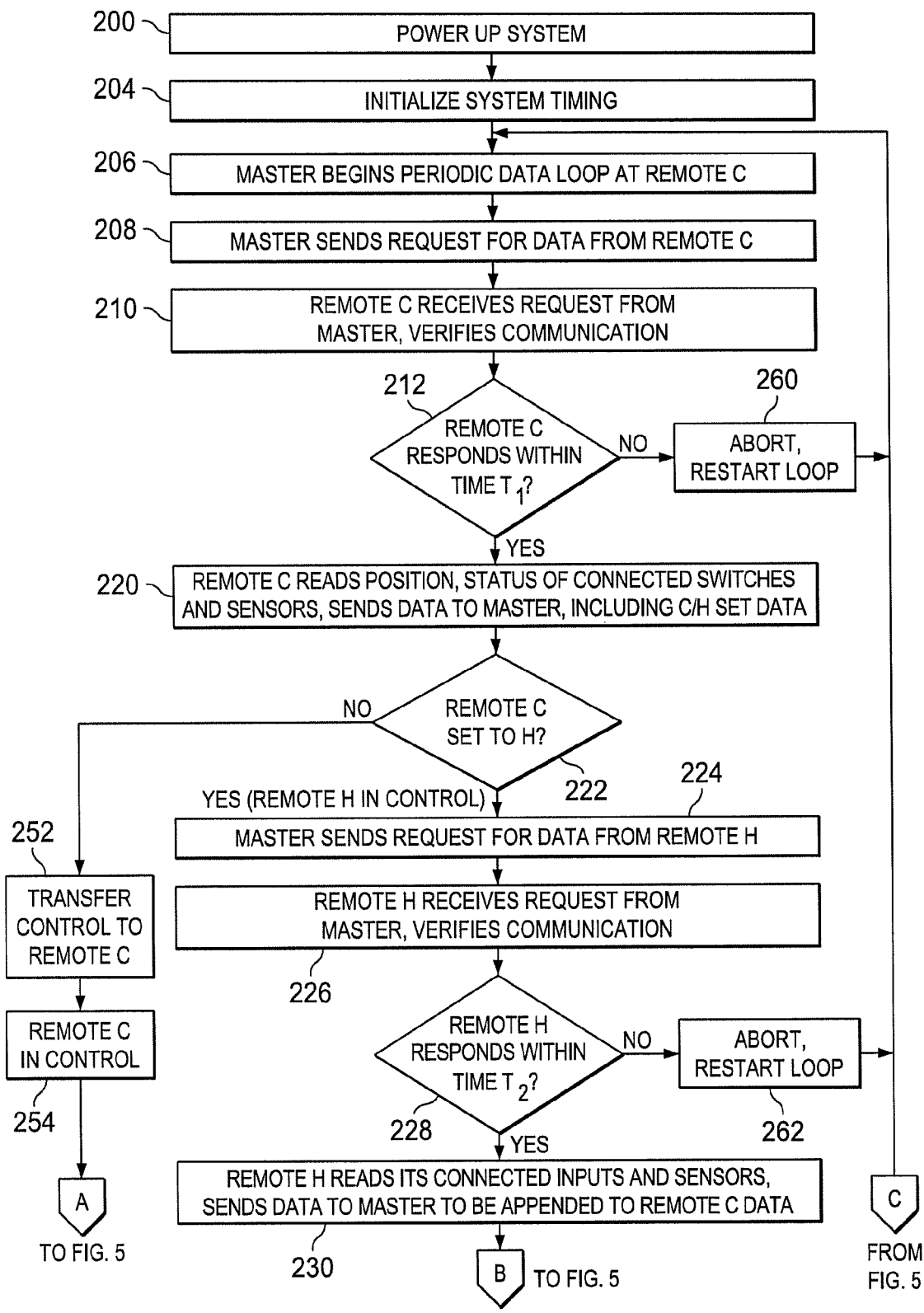
FIGS. 4 and 5 illustrate a flow chart for operations performed by the control network in the embodiment of FIGS. 1, 2, and 3.
Figure 5:
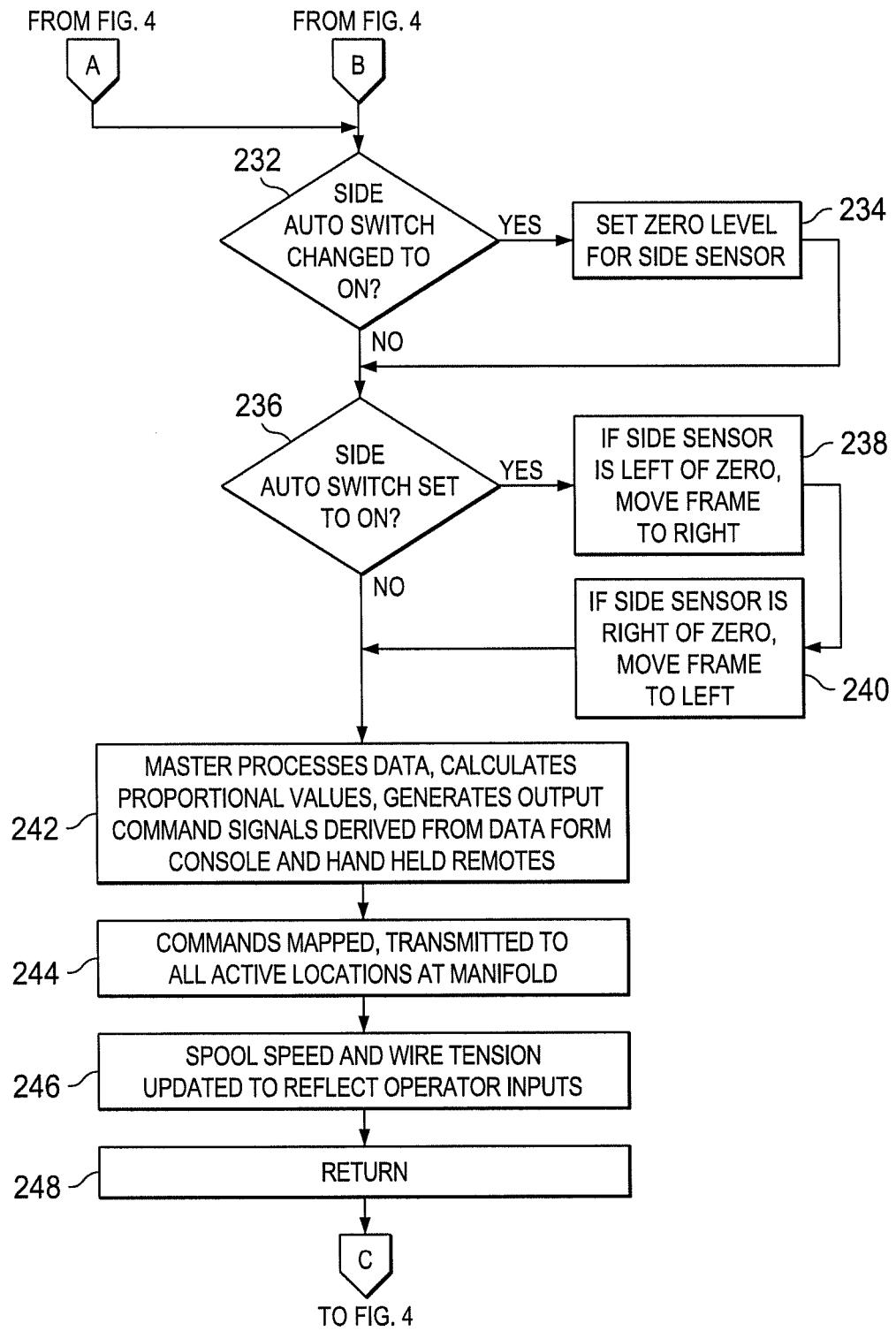

FIGS. 4 and 5 illustrate a flow chart for basic operations performed by the control network in the embodiment of FIGS. 1, 2, and 3 each time the system is placed in operation. The flow begins at step 200 to power up the system, followed by initialize system timing in step 204 and in step 206 the master M1 commences' running a periodic data loop, beginning with the remote console C (24). Accordingly, the master M1, in step 208, sends a request for data from the console C to obtain information about its status—the settings of switches, any on-board sensors, and the potentiometer 110 (See FIG. 2). The console C receives and acknowledges (verifies) the request to the master M1 in step 210. The master M1, then waits for the response from console C at the test step 212. If there is no acknowledgment response, preferably within a timeout interval $T_1$, the flow passes to step 260 to abort the data loop sequence and return to step 206 as shown. If the console C responds within the timeout interval $T_1$, the flow advances to step 220, whereby the console C reads the position and status of connected switches and sensors and sends the data to the master M1. In step 220, the console also sends the set data for the Remote/Console switch 112 (See FIG. 2), to inform the master M1 whether the console C or the hand-held H (22) unit has operative control of the system. The master M1 reads the set C/H data and proceeds to the next step 224. Recall that in the wireless machine control network 10 depicted in FIG. 1, the operator may, as a convenience, move freely about the hydraulic systems 12, 14 while using the hand-held remote H (22) to operate the most-used controls. This is one of the important advantages of the present invention.

Continuing with FIGS. 4 and 5, in step 224 the master M1 sends a request to the hand-held H unit (22) to enter the data loop followed in sequence by the receipt of this request by the hand-held H unit and its verification to the master M1 in step 226. The master M1 awaits the response from the hand-held unit H for the timeout interval T2 in step 228. If the timeout interval T2 expires before verification from the hand-held unit H is received, the flow passes to step 262 to abort the data loop sequence and return to step 206 as shown. If the hand-held unit H (22) responds within the timeout interval $T_2$, the flow advances to step 230, whereby the hand-held unit H (22) reads the position and status of connected switches and sensors and sends the data to the master M1. Returning to the test step 222, if the master M1 receives an indication that the console C remote (24) is not set to give control of the network 10 to the hand-held unit H (22), the master M1 transfers control to the console C (24) in step 252, whereupon the console C (24) becomes the site of subsequent control operation until the setting of the Remote/Console switch 112 is changed.

Continuing with FIG. 5, the flow advances to step 232 to test whether the side auto switch has been changed from an OFF to an ON position. The side auto switch enables a side sensor for indicating the lateral orientation of the frame 430 that supports the poly spool 408 with respect to the well 404 so that the side-to-side alignment of the poly pipe 410 with the well 404 can be maintained as the poly pipe is unwound from or wound onto the spool. Once the side auto switch is ON, the zero level for the side sensor may be set to zero in step 234. If the side auto switch has not been changed to ON, the flow proceeds to step 236 to set this switch to ON so that, in steps 238 and 240 the frame can be moved to the right or to the left respectively to orient the poly spool 408 as described above. Then, in step 242, the master M1 processes the data from the hand-held unit H (22) and/or the console unit C (24), depending on which unit H or C is in control, and calculates proportional values as necessary for functions not strictly binary or ON/OFF actions, and generates output command signals derived from the loop data. Subsequently the output command signals are mapped and transmitted to the respective active locations at the manifold 122 in step 244. Following this action, in step 246 the spool rotational speed and wire tension settings are updated to reflect the inputs entered by the operator on either the hand-held H (22) or console C (24) unit that is in control. Following activation of the hydraulic system through the foregoing sequence, the process returns to step 206 and repeats until the system is powered down.

In the foregoing process of FIGS. 4 and 5, the same routine is followed by the master M2 if and when it is powered up, the only difference being that its output signals are routed to different actuating elements of the hydraulic system to which it is connected. In the present example, the master M2 controls the operation of the secondary hydraulic system 14, which in this example, may be the crane 490 shown in FIG. 7. The same process steps used in master M1 to control the primary hydraulic system 12 are used in the master M2 to control similar functions in the secondary hydraulic system. For example, the side-to-side functions of the crane 490 may also be used to control the side-to-side functions of the tower 416, the cable in/cable out functions of the crane may be controlled by the forward/aftward functions of the tower 416, and the crane up/down functions may be controlled by the pump rack up/down functions of the primary hydraulic system 12.

Persons skilled in the art will appreciate that some of these functions may be assigned or reassigned by changing wired connections from the master M1 or M2 in use. Persons skilled in the art will also appreciate the versatility of the control actions that can be provided by the combination of the wireless machine control network and hydraulic system(s) described herein. This versatility of control actions is a direct and significant function of the types of sensors that may be included in the nodes of the network. One example of this versatility is provided in FIG. 6 to be described, wherein the kind of control action made possible by including a three-axis accelerometer in each node, particularly in the hand-held Remote unit H (22). The processes performed by the network in response to such sensors is essentially the same as illustrated by the process depicted in FIG. 6.

Figure 6:
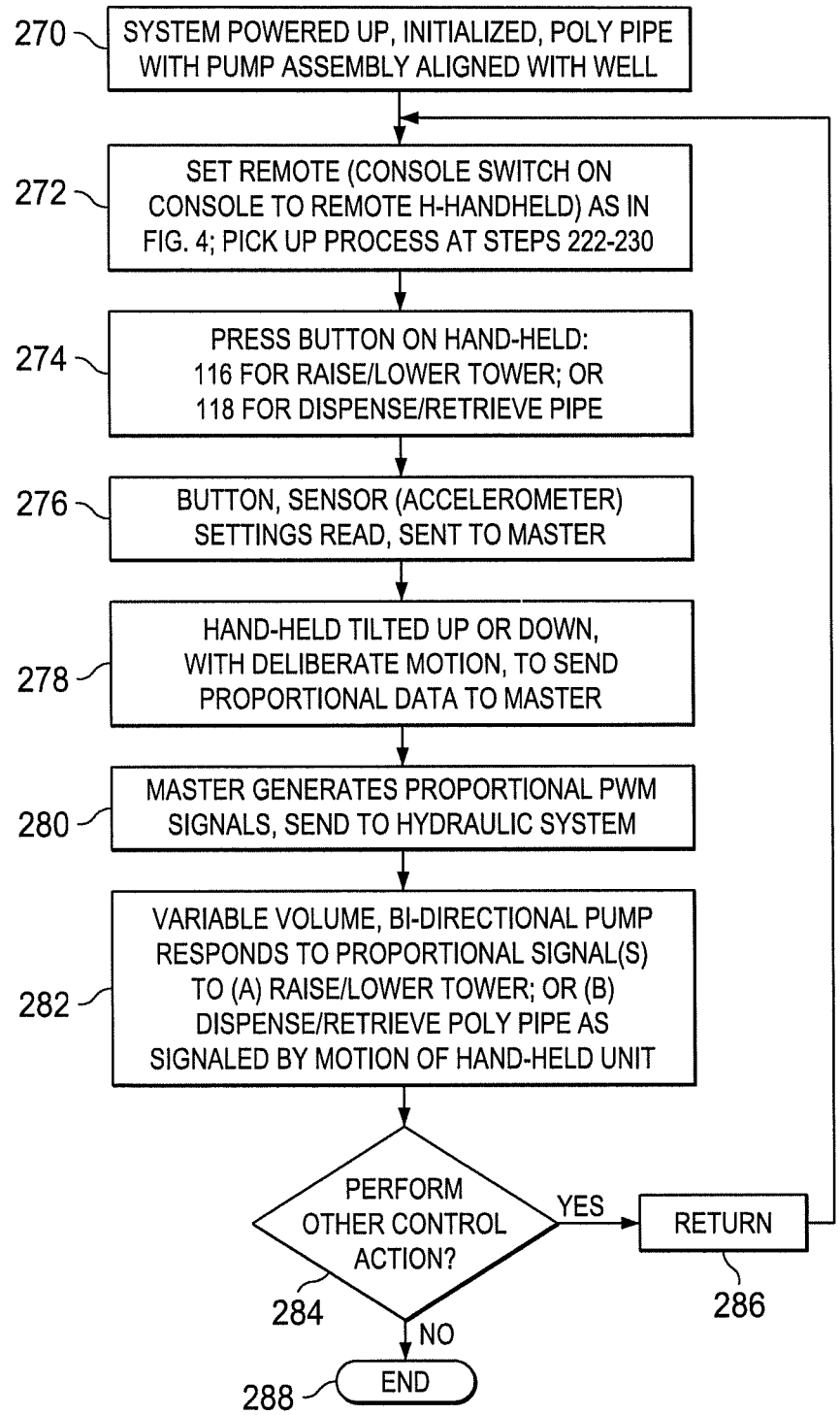
FIG. 6 illustrates an exemplary flow chart for operations controlled by changes in the position or attitude of a handheld remote unit.
Figure 8:
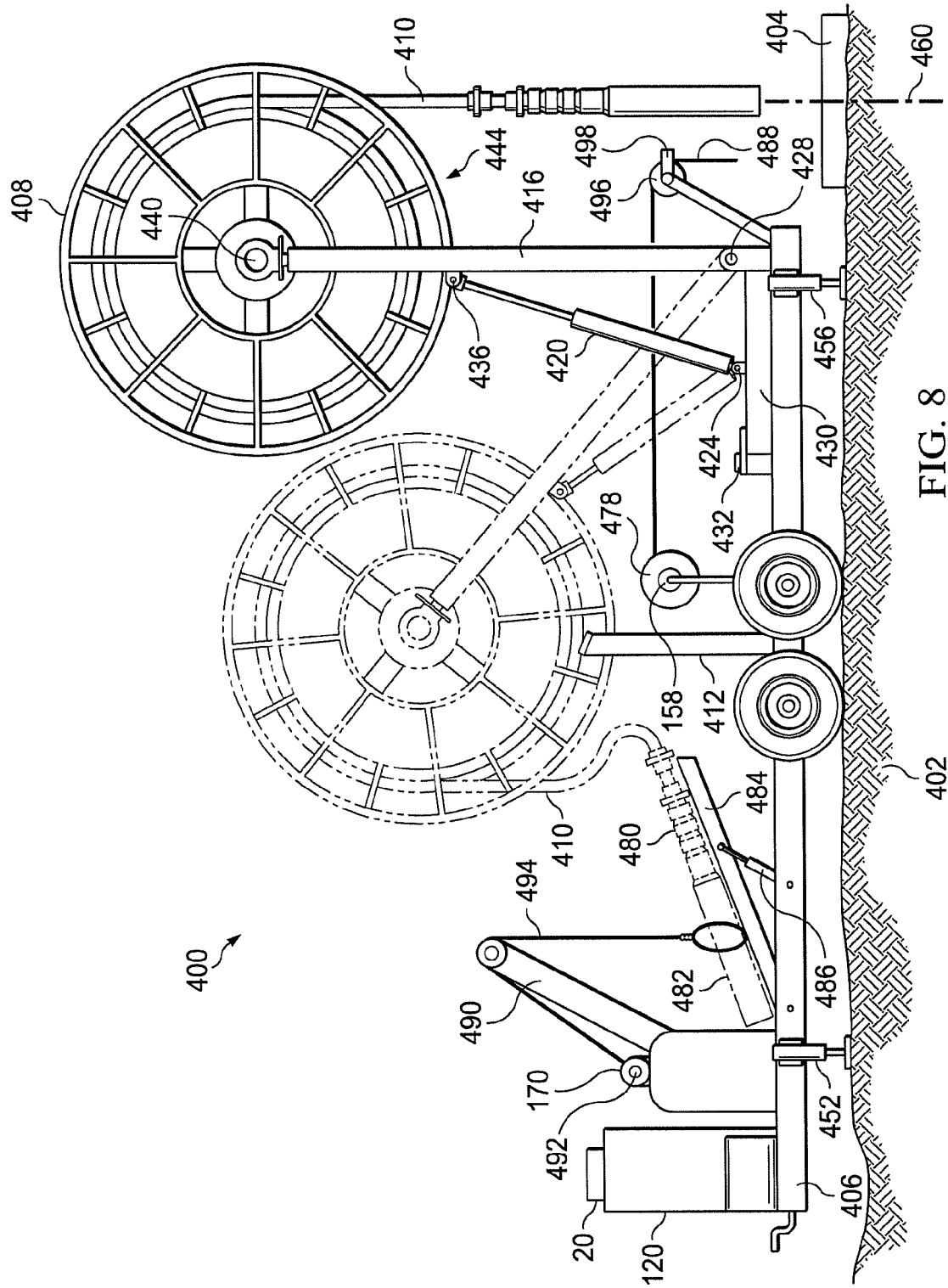
FIG. 8 illustrates a pictorial drawing of a second aspect of the rig shown in FIG. 7.

FIG. 6 illustrates a flow chart for operations controlled by changes in the position or attitude of a hand-held remote unit, the Remote hand-held unit H (22), which is an important feature of the present invention. The process begins at step 270, with the system powered up, initialized, and with a pump assembly 480, 482 installed on the end of the poly pipe 410 and positioned in alignment with the well bore as shown in FIG. 8 (to be described). In this example, the Remote/Console switch 114 (See FIG. 2) is set in step 272 to the remote H position to assign control to the hand-held remote unit (22) as noted in FIG. 4, and the process proceeds as in steps 222 to 230 of FIG. 4. Assuming that buttons (switches) are provided on the hand-held unit H (22) to raise/lower (116) the tower 416 or dispense/retrieve (118) the poly pipe 410 (See FIGS. 2 and 8), the operator operates the desired button (switch) in step 274 to initiate the intended control action. In response, per step 276 the hand-held unit 22 reads the settings of the three axis accelerometer (74a—FIG. 2) in the hand-held unit 22 and sends this data to the master M1 for further processing.

In step 278, the hand-held remote H (22) may be tilted up or down to indicate the action intended following the operation of the button (switch) by the operator. If the hand-held unit H is tilted up, the sensor signal is interpreted as a "raise" the tower 416 if the button 116 was operated. If the hand-held unit H (22) is tilted down, the sensor signal is interpreted as a "lower" the tower 416 if the button 116 was operated just prior. If, however, the button (switch) 118 was operated, then tilting up is interpreted as "dispense" the poly pipe 410—i.e., unwind the poly pipe from the spool 408—and tilting down is interpreted as "retrieve" the poly pipe 410 by winding it back onto the poly spool 408. The degree of tilt of the hand-held unit H (22) may be interpreted as the speed of movement of the tower 416 or the speed of rotation of the poly spool 408 as controlled by the hydraulic motors under the control of the master M1 responsive to the sensor data that provide proportion signals to the master M1. This control is governed by the proportional signals used by the master M1 in step 280, which generates the proportional PWM signals that are sent to the actuating components (solenoids, relays, etc.) in the hydraulic system shown in FIG. 3. These signals, in this example, provide the information utilized in step 282 to operate the spool up/down solenoids 176, 178 to raise or lower the tower 416, or the variable volume, bidirectional displacement pump to dispense or retrieve the poly pipe from or onto the spool 408. In step 284, the user may determine whether other functions are to be performed. If Yes, then the process may return in step 286 to step 272; if No, the process ends at step 288.

The process described in FIG. 6 is illustrative of the basic control sequence that may proceed for responding to the state of any sensor in the system. As shown in FIG. 2, there may be a variety of sensors located on board the units in the nodes of the network or located in the hydraulic system. To illustrate this capability, FIG. 2 includes in the master M1 a possible group of sensors including accelerometer 74a, tachometer 74b, a GPS receiver 74c, compass 74d, thermometer 74e, spectrometer 74f, camera 74g, and other 74h. any of these sensors may also reside in other node units—the master M2, console unit H (22) and hand-held unit (24).

The process described in FIG. 6 is also illustrative of the kind of control that may be employed in a two-node network where one node is attached to a mobile machine such as a track vehicle—examples may include a steer loader, tractor, or various kinds of agricultural implements—and the second node may be a hand-held unit operated by a user that is remote—some distance away—from the mobile machine. The control is executed in response to sensor data from a three-axis accelerometer in the handheld unit (under program control) by transmitting actuating signals to the on-board unit. The actuating signals are processed to operate the machine elements of the mobile machine. The three-axis accelerometer in the mobile machine provides the means to interpret the mobile machine's actuating signals or to provide feedback to the operating control program so that the actions of the mobile machine mimic the movements of the hand-held node.

FIGS. 7 and 8 to be described include a number of structural features illustrated in other drawings; thus structures identified by the same reference numbers in more than one drawing can be assumed to refer to the same structure. FIG. 7 illustrates a pictorial drawing of a portion of a mobile rig for dispensing polyethylene pipe into subsurface wells under the control of the embodiment of FIGS. 1 through 6. In this view, the poly spool tower 444 is shown in its transport position before being erected on site near a well 404. The rig 400 is positioned on the surface 402 near a well 404 with which the poly pipe 410 will be aligned. The rig 400 includes a chassis 406 that supports a poly spool 408 loaded with poly pipe 410 on supports 412. The rig 400, upon being placed in position, may preferably be stabilized and leveled using a hydraulic jack at each corner. Jacks 452, 456 and 458 are shown; jack 454, located behind the rig 400 in this view is not visible. These jacks, may be controlled by the wireless machine control network operating in conjunction with the hydraulic system(s) 12, 14 illustrated in the drawings.

The hydraulic control components of the mobile rig are shown in FIG. 3 and the functions identified in Table 1 herein. In the rig 400 itself, here is a support 412 on both sides of the rig 400; however, only the near side support 412 is visible in the view of FIG. 7. The spool 408 may be caused to rotate by the spool motor 440 located at the hub of the spool 408. The spool 408 may be raised and lowered on the first 416 and second 418 tower struts, which are pivoted at the point they are attached to the movable frame 430 at the pivots 428, 438. The frame 430 is configured to pivot about the pivot 432 when the hydraulic cylinder 470 is activated. The hydraulic cylinder 470 is fixed to the chassis 406 at its inboard end 472 and to the frame 430 at its outboard end 476. Not shown in this view is the side adjust sensor described in FIG. 5. The struts 416, 418 of the tower 444 are raised or lowered by the action of hydraulic cylinders 420, 422 under the control of the master M1 or hand-held H (22) as described previously. Also located on the chassis 406 is an assembly that includes the hydraulic apparatus 120 including the manifold 122 and its associated components, along with the diesel engine 154 shown in FIG. 3. The reservoir 124 for the hydraulic fluid may be positioned near the hydraulic assembly 120 as shown. In typical applications, the master M1 (and/or master M2) may be mounted close to the hydraulic system components on the rig 400.

FIG. 8 illustrates a pictorial drawing of a second aspect of the rig shown in FIG. 7 to show additional features of the rig 400. The spool tower 444 is shown in an elevated orientation in position to dispense poly pipe 410 into the well 404 along the well axis 460. A submersible pump 480 and motor 482 assembly are shown attached to the end of the poly pipe 410. A wire spool assembly 478, including a wire spool motor 158 is shown supported on the chassis 406. Wire 488 from the wire spool assembly 478 extends over an idler wheel 496 supported on a member 498 that is positioned to guide the wire 488 into the well 404 as needed. As described previously (FIG. 3) the wire motor 158 may be controlled such that the tension on the wire is regulated as it is dispensed into the well.

In FIG. 8 a submersible pump 480 and motor 482 assembly are also shown disposed on a pump rack 484 that is elevated in this view form the chassis 406 by the hydraulic cylinder 486 to place the submersible pump 480 and motor 482 into position to be connected to the end of the poly pipe 410, shown in this view in dashed lines. The pump rack 484 is needed because the submersible pump 480 and motor 482 assembly is quite heavy and is more easily lifted into position for attachment to the poly pipe using the pump rack 484. Also shown in FIG. 8 is the crane 490 supported on the chassis 406. The crane 490, including a lift cable 494 may be operated by a hydraulic winch motor 170, which provides dedicated control of the winch 492 when the submersible pump 480 and motor 482 assembly are to lifted onto the pump rack 484.

While the invention has been shown in only one of its forms, it is not thus limited but is susceptible to various changes and modifications without departing from the spirit thereof. The concepts and principles of the invention are not limited to the wireless control of hydraulic system elements. For example any kind of machinery that employs actuators and electrical, mechanical, and hydraulic components to effect a function or operation such as moving, lifting, installing, dispensing and other actions may be provided with remote control by a wireless network of control units containing programmed circuitry. In another example, each of the nodes may include the same micro controller, operating program, wireless transceiver, on-board sensor(s), etc. This would permit any node to assume in some applications, simply by its position in the network and the address assigned to it, the role of master or hand-held or console.

The use of three-axis accelerometers simplifies and facilitates control, especially when the control functions include actions of movement, direction, speed, angle, and the like. Control units may be hand-held, mounted on a helmet or other headgear where the motion of a person's head may be translated into a control action of a controlled device communicated via the wireless network described herein. For example, any gesture or movement that a person can perform with a hand, arm, head, leg, foot, etc may be translated into a control action. Thus, motion of one unit in communication with another unit in the network can be used to instruct the other unit or elements of the hydraulic (or even machines operated by other conductive mediums, including fluid, gas, or electrical) machine in the system what direction, or how high or low, or how fast or slow to move as part of a control signal. As another example, a paralyzed person could control a computer, a motorized wheel chair or other appliance or furniture item, or even an automobile. On a smaller scale, a prosthetic device may be susceptible to control by a system as described herein. The motion activated controllers described herein may be equipped with inputs coupled to various sensors attached to the controlled device to convey operating parameters and provide feedback to enhance control functions.

The invention is not limited to a mesh topology, although it is perhaps more suited to small networks. A number of possible network topologies are possible as mentioned herein. Alternatives, for example, may include a modified tree network or a star network, with each master in control of a plurality of nodes. The use of first and second masters in communicate with each other as well as both the hand-held and console remote units may define a limited hierarchy of the nodes on the network. further, a network may have several buses, A, B, C, etc., each one being defined by some or all of the serial I/O ports within each of the first and second master unit processors. The first master unit might have one set of serial I/O ports defined as bus A, and another set of its serial I/O ports defined as bus B. The second master unit may have one set of its serial I/O ports defined as bus C. Each node connected to a bus has a unique address. The second master unit may be connected to the first master unit via a defined connection. The connections in this network preferably may be via wireless links. In this example, each serial I/O port may be connected to an RF transceiver circuit to provide the two-way serial communication on the respective link.

What is claimed is:

1. A hydraulic machine control system, comprising:
a hydraulic machine having a plurality of actuating devices coupled to a manifold for controlling a plurality of hydraulic mechanisms coupled to said manifold;
an electronic network of at least first, second, and third nodes, each said node including a processor circuit board in wireless communication with each other node in said network; wherein
each said processor circuit board comprises at least a CPU having a plurality of individually addressable serial I/O ports, and a communications transceiver;
said serial I/O ports include a plurality of electrical inputs and outputs, at least one input port of each said node connected to a sensor device on said processor circuit board;
each said output of said first node connected to a corresponding actuating device for a hydraulic mechanism in said hydraulic machine control system; and
each said processor circuit board including at least one user-operable switch device coupled to said CPU for initiating execution of at least one operation of machine control in said system.

2. The system of claim 1, wherein said sensor device is a three-axis accelerometer.

3. The system of claim 1, wherein said sensor device is selected from the group consisting of an accelerometer, gyroscope, and position sensor.

4. The system of claim 1, wherein said first node is operable to control a hydraulic mechanism responsive to gesture signals sent via said network from one of said second and third nodes on said network.

5. The system of claim 1, wherein said electrical outputs include pulse-width-modulated (PWM) and ON/OFF control signals for operating hydraulic mechanisms selected from the group consisting of hydraulic cylinders, hydraulic motors, and hydraulic jacks.

6. The system of claim 1, wherein said electrical outputs include analog control signals from a digital-to-analog converter in said processor circuit board for operating hydraulic mechanisms selected from the group consisting of hydraulic cylinders, hydraulic motors, and hydraulic jacks.

7. The system of claim 1, wherein said network is configured as a mesh network.

8. The system of claim 1, wherein a control operation of said machine control is selected from the group consisting of forward and reverse rotation of a take up spool, rotation speed of said take up spool, side-to-side disposition of said take up spool, rotation speed of a shaft, extension and retraction of a telescoping beam element, angle of elevation of said beam, angle of elevation of a crane, angle of azimuth of a crane, extension of said crane, and elevation of at least one jacking mechanism.

9. The system of claim 1, wherein each said processor circuit board is housed in an enclosure such that said at least one user-operable switch device is accessible to a user for entering an operation of machine control.

10. The system of claim 1, wherein said at least one input port includes a plurality of user-operable switches for initiating control operations of machine control of said hydraulic mechanisms.

11. The system of claim 1, wherein said communications transceiver is coupled to said CPU via a communications interface.

12. The system of claim 1, wherein said serial I/O ports include a plurality of inputs, each said input coupled to a corresponding sensor device on said processor circuit board.

13. The system of claim 1, wherein said serial I/O ports include a plurality of inputs, each said input coupled to a corresponding sensor device.

14. The system of claim 1, wherein said serial I/O ports further include digital outputs, each said digital output coupled to a corresponding ON/OFF actuating device.

15. The system of claim 1, wherein said first node is configured as a master unit and includes a plurality of user-operable switches for initiating commands.

16. The system of claim 1, wherein said second node is configured as a handheld remote unit and includes a plurality of user-operable switches for initiating commands.

17. The system of claim 16, wherein said handheld remote is powered by a power source selected from the group consisting of a battery, solar generator, and wired electricity.

18. The system of claim 1, wherein said third node is configured as a console remote unit and includes a plurality of user-operable switches for initiating commands.

19. The system of claim 1, wherein said actuating device comprises a pneumatic actuator.

20. The system of claim 1, wherein said hydraulic machine control system is adapted to control of apparatus selected from the group consisting of a flexible conduit dispensing device for water or gas well installations, a bulk communications cable dispensing device, a skid-steer loader, a backhoe machine, and a crane.

21. The system of claim 1, wherein said hydraulic machine control system is adapted to control of apparatus selected from the group consisting of an aggregate dispenser, and machines adapted to lifting, pressing, bending, conveying, cutting, stamping, molding, and combinations thereof.

22. The system of claim 1, said network further comprising:
a fourth node configured as a second master unit including a processor circuit board in wireless communication with each other node in said network.

23. A hydraulic machine control system, comprising:
an electronic network of at least first and second nodes, each said node including a processor circuit board in wireless communication with each other node in said network; wherein
each said processor circuit board comprises at least a CPU having a plurality of individually addressable serial I/O ports, and a communications transceiver;
said serial I/O ports include a plurality of electrical inputs and outputs, at least one input port of each said node connected to a sensor device on said processor circuit board;
each said output of said first node connected to a corresponding actuating device for a hydraulic mechanism in said hydraulic machine control system; and
each said processor circuit board including at least one user-operable switch device coupled to said CPU for initiating execution of at least one operation of machine control in said system.

24. The machine control system of claim 23, wherein said first node is operable to control a hydraulic mechanism responsive to gesture signals sent via said network from said second node on said network to said first node.

* * * * *

UNITED STATES PATENT AND TRADEMARK OFFICE
CERTIFICATE OF CORRECTION

PATENT NO. : 9,360,852 B2  
APPLICATION NO. : 13/921769  
DATED : June 7, 2016  
INVENTOR(S) : Billy R. Masten et al.

It is certified that error appears in the above-identified patent and that said Letters Patent is hereby corrected as shown below:

On the title page, item (54) and in the specification, Col. 1, line 2, in the Title of the Patent, please change "or" to "for".

Signed and Sealed this  
Nineteenth Day of July, 2016

Michelle K. Lee  
*Director of the United States Patent and Trademark Office*